UNITED STATES PATENT OFFICE.

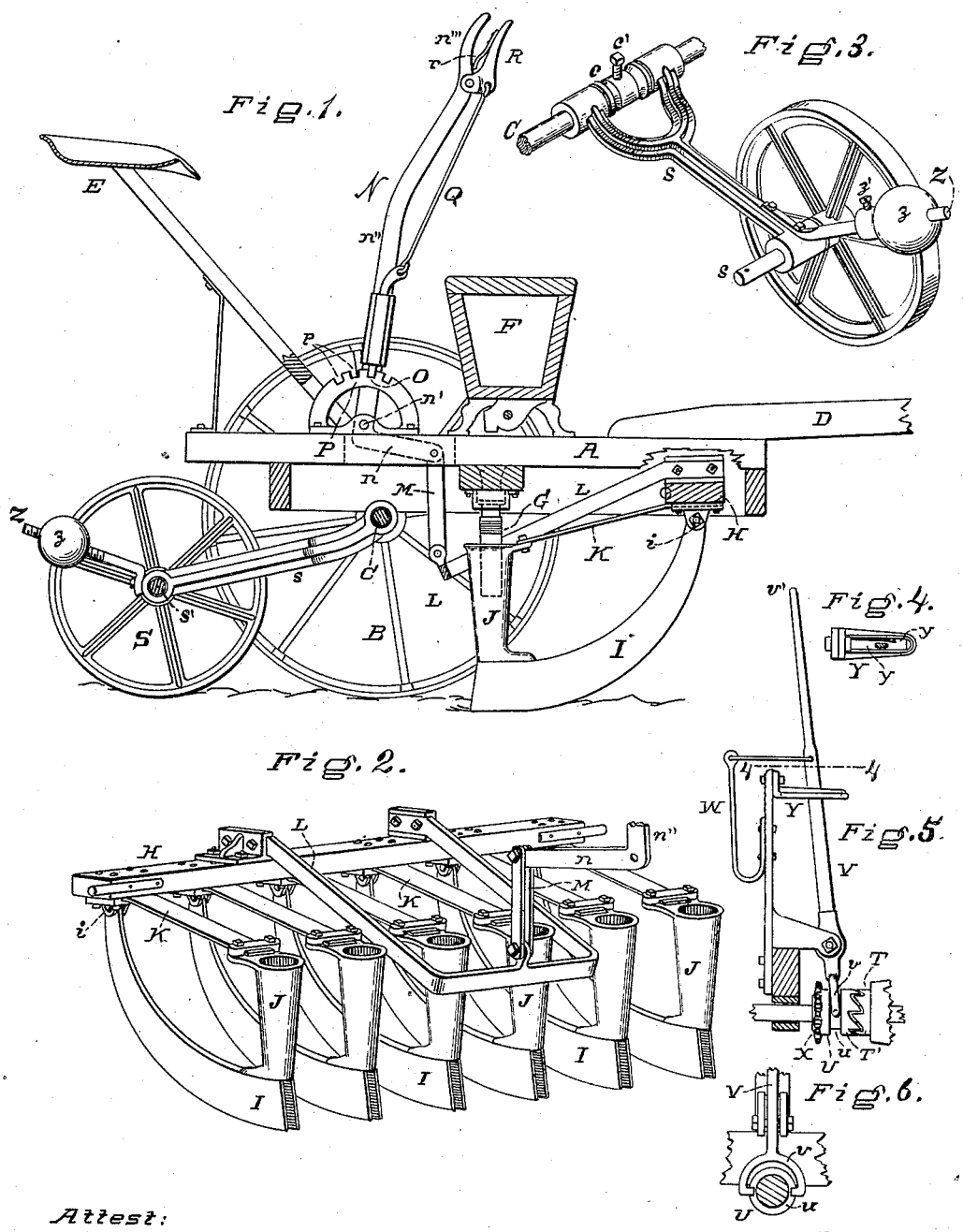

LEONARD KISSNER AND JOHN J. GROMME, OF LANCASTER, OHIO, ASSIGNORS TO THE HOCKING VALLEY MANUFACTURING COMPANY, OF SAME PLACE.

GRAIN-DRILL.

SPECIFICATION forming part of Letters Patent No. 343,907, dated June 15, 1886.

Application filed March 19, 1886. Serial No. 195,827. (No model.)

*To all whom it may concern:*

Be it known that we, LEONARD KISSNER and JOHN J. GROMME, both of Lancaster, Fairfield county, Ohio, have invented new and useful Improvements in Grain-Drills, of which the following is a specification.

Our invention relates, primarily, to improvements in that class of grain-drills in which the seed is dropped into grooves made in the ground by runners which are dragged by the frame of the drill, the seed being then covered by pressing-wheels dragged in the wake of the runners.

Our invention comprises means for regulating the depth of said grooves by bringing more or less of the weight of the frame and its load to bear upon said runners, and means for regulating the downward pressure of the said pressing-wheels.

In the accompanying drawings, Figure 1 is a vertical section from front to back of a grain-drill of the class described provided with our depressing devices for the runners and pressing-wheels. Fig. 2 is a perspective view of the runners and their dragging and depressing device detached from the drill-frame. Fig. 3 is a perspective view of one of the pressing-wheels with its dragging and depressing device detached from the rest of the drill. Fig. 4 is a horizontal section on the line 4 4 in Fig. 5. Fig. 5 is an elevation of the clutch mechanism herein referred to. Fig. 6 is a vertical section of the sliding clutch-sleeve, showing its groove and the yoke which engages therein.

A represents the frame of the drill, supported on ground-wheels, (of which one is shown at B,) whose axle, C, is journaled in bearings in said frame.

D is the tongue, and E is the seat for the driver.

The seed-box F may be provided with any suitable mechanism for dropping the seed or grain in drills through discharge-tubes, one of which is shown at G.

Journaled in the forward end of the frame A is a cross-beam, H, to whose under side are pivoted independently of one another runners I, arranged in a rank or abreast. Each runner I is attached by a pivot, $i$, at its forward end to the cross-beam H, and at its rear end trails on the ground and carries a boot, J, which receives the grain from one of the tubes G and guides it into the groove made in the ground by the runner. The top of the boot J is connected to the cross-beam H by an elastic band, K, constituting a spring-brace, which is placed with its direction of greatest width horizontal, so as to yield vertically but not horizontally, and thus, while permitting up-and-down motion of the runner, to prevent its sidewise motion.

A U-formed frame, L, is rigidly fastened at its forward end to the cross-beam H, and is connected at its rear end by a link, M, to an arm, $n$, of a lever, N, which is pivoted to the frame A at $n'$ in the vicinity of the seat E. The other arm, $n''$, of this lever extends upward, and at its end is formed into a hand-hold, $n'''$, to enable its convenient manipulation by the driver. The arm $n''$ is retained to any position to which it may be moved by a bolt, O, which engages in one or other notch $p$ of a segment-rack, P. This bolt is connected by a wire, Q, with a finger-grip, R, on the hand-hold of the arm $n''$. Said finger-grip is pressed outward by a spring, $r$, which assists the weight of the bolt in driving the latter into any notch $p$ with which it is in apposition. By grasping simultaneously the hand-hold and finger-grip and drawing in the latter the driver can release the bolt O from engagement with the rack P, and can then move the arm $n''$ forward or backward. When said arm is moved forward, the rear of the frame L is depressed and the cross-beam H is tilted backward, causing the springs K to bear down harder on the boot J, and to thus force the runners deeper into the ground, so as to make a deeper groove therein. At the same time the horses and ground-wheels are relieved of a portion of the weight of the tongue and of the frame with its load, such portion being supported by runners I. A backward shift of the arm $n''$ operates to raise the frame L, thereby decreasing the downward pressure on the runners I and causing them to make shallower grooves in the ground. The independent pivots and springs of the runners I allow them while being simultaneously pressed into the ground to yield independently of one another to inequalities thereof. The grain is covered by pressing-wheels S, which are arranged abreast, one in the wake of each runner I, and are dragged by arms $s$, pivoted on the axle C. At its forward end each of said arms forks and terminates in eyes that receive the axle C and embrace between them a collar, $c$, fastened to said axle by a set-screw, $c'$. This collar prevents shifting of the arm along the axle C. Each of the arms $s$ carries at its rear end an axle, $s'$, on which are journaled on opposite sides of the arm two of the wheels S.

To the rear end of each arm $s$ is secured a rearwardly-projecting bar, Z, which carries a weight-ball, $z$, which is capable of adjustment along the bar so as to enable it to exert any required depressing effect on the wheels S. To enable such adjustment, the bar Z may be screw-threaded, as shown in Fig. 1, and engage in a tapped bore in the ball $z$; but it is preferred to make the ball capable of sliding along the bar and of being fastened at any point thereof by a set-screw, $z'$, as shown in Fig. 3.

The feed mechanism of the drill is driven from the axle C through a clutch consisting of two crown-wheels, T T', which are adapted to engage together, and of which one is fast on the axle, while the other is on a sleeve, U, loose on the axle, and having a circumferential groove, $u$, in which engages a yoke, $v$, at the foot of a lever, V, pivoted to the frame A and acted upon by a spring, W, whose tension operates to hold the clutch-wheels T T' into engagement. A portion of the sleeve U is formed into a sprocket-wheel, X, over which engages the driving-chain of the feed mechanism. Each tooth of the clutch-wheels T T' has an inclined and an abrupt face in the manner of a ratchet-wheel tooth, and when the machine is moving forward the abrupt faces bear against one another so as to drive the feed mechanism; but when the machine is backing the inclined faces of said teeth bear on one another, and the elasticity of the spring W permits the teeth of the wheel T' to jump over those of the wheel T, so that the feed mechanism remains at rest.

The lever V is formed into a handle, $v'$, at its upper end, to enable unclutching of the wheels T T' by the driver. Said lever works in a guiding-slot, $y$, in a projection, Y, from the frame A, said slot having a notch, $y'$, into which the lever V may be pushed when in its unclutching position, so as to be detained therein.

We claim as new and of our invention—

1. In a grain-drill, the combination of a cross-beam, H, pivoted at both ends to the drill-frame, and runners I, pivoted independently of one another directly to said cross-beam, and means for rocking said beam on its pivots, substantially as and for the purpose set forth.

2. In a grain-drill, the combination, with the frame A, of the cross-beam H, pivoted at its extremities to said frame, the runner I, pivoted at its forward extremity directly to said pivoted cross-beam, the boot J, secured to the rear of said runner, the spring-plate K, connected at its respective ends to said pivoted beam and boot, and means for rocking said beam on its pivots, substantially as set forth.

3. In a grain-drill, the combination, with the frame, of the pivoted cross-beam H, the runners I, each pivoted at its forward extremity directly to said beam, the plate-springs K, connecting the rear extremities of said runners with said beam, the lever-frame L, rigidly connected to said beam, the operating-lever N, and the rigid link M, connecting said operating-lever N and lever-frame L, whereby the runners I may be forced into the earth, substantially as set forth.

4. In a grain-drill, the combination, with an arm hinged so as to be capable of free vertical movement and a pressing-roller carried thereby, of a weight adjustably secured to said arm for exerting a variable force upon the pressing-roller, substantially as set forth.

5. In a grain-drill, the combination of collar $c$, fastened to the axle C by a set-screw, and arm $s$, carrying a presser-wheel axle at its rear end and at its front end forking and terminating in eyes that receive the axle C and embrace the collar $c$, substantially as and for the purpose specified.

6. In a grain drill, the combination, with arms $s$, journaled at their front ends on the axle C, and having the presser-wheels S, journaled at their rear ends, of the bars Z, projecting rearwardly from said arms and carrying slidable weight-balls $z$, having fastening set-screws $z'$.

In testimony of which invention we hereunto set our hands.

LEONARD KISSNER.
JOHN J. GROMME.

Attest:
C. W. McCLEERY,
J. F. BECK.